US008959994B2

(12) United States Patent
Tai et al.

(10) Patent No.: US 8,959,994 B2
(45) Date of Patent: Feb. 24, 2015

(54) THERMAL SENSOR WITH TEMPERATURE CONTROL

(71) Applicant: Taiwan Semiconductor Manufacturing Company, Ltd., Hsinchu (TW)

(72) Inventors: Chia Liang Tai, Taichung (TW); Alan Roth, Leander, TX (US); Eric Soenen, Austin, TX (US)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 93 days.

(21) Appl. No.: 13/895,971

(22) Filed: May 16, 2013

(65) Prior Publication Data
US 2014/0269839 A1 Sep. 18, 2014

Related U.S. Application Data

(60) Provisional application No. 61/799,544, filed on Mar. 15, 2013.

(51) Int. Cl.
*G01C 21/00* (2006.01)
*G01L 19/08* (2006.01)
*G01F 5/00* (2006.01)
*G01K 7/34* (2006.01)

(52) U.S. Cl.
CPC ........................................ *G01K 7/34* (2013.01)
USPC .......... 73/184; 73/204.11; 73/204.17; 73/712

(58) Field of Classification Search
None
See application file for complete search history.

(56) References Cited

U.S. PATENT DOCUMENTS

| 4,417,688 | A  | * | 11/1983 | Schnaibel et al. | ............ | 236/91 F |
| 4,620,084 | A  | * | 10/1986 | Cunningham et al. | ........ | 219/497 |
| 6,914,764 | B2 | * | 7/2005  | Clabes et al. | ................. | 361/103 |
| 7,565,258 | B2 |   | 7/2009  | Duarte | | |
| 8,136,987 | B2 |   | 3/2012  | Luria et al. | | |

(Continued)

OTHER PUBLICATIONS

Shor, Joseph, et a., "Ratiometric BJT-Based Thermal Sensor in 32nm and 22nm Technologies", 2012 IEEE International Solid-State Circuits Conference, Session 11, Sensors & MEMS 11.8, pp. 210-212.

(Continued)

*Primary Examiner* — Lisa Caputo
*Assistant Examiner* — Jermaine Jenkins
(74) *Attorney, Agent, or Firm* — Lowe Hauptman & Ham, LLP

(57) ABSTRACT

In a thermal sensor. a capacitor voltage of a capacitor is compared with a reference voltage, and an output voltage is generated based on the comparison. The output voltage has a pulse density indicative of a temperature detected by the thermal sensor. The capacitor is charged or discharged using at least one of a first current signal or a second current signal based on a logic level of the output voltage. The first current signal is a temperature-independent signal, and the second current signal is a temperature-dependent signal dependent on the temperature detected by the thermal sensor. In some embodiments, a clock rate of a clock signal is varied in accordance with the detected temperature to control a timing operation for supplying the first current signal to the capacitor and/or the reference voltage is varied in accordance with the detected temperature.

20 Claims, 6 Drawing Sheets

(56) References Cited

U.S. PATENT DOCUMENTS

| | | | |
|---|---|---|---|
| 8,571,492 B2* | 10/2013 | Berchtold et al. | 455/91 |
| 2010/0164552 A1 | 7/2010 | Luria et al. | |
| 2011/0200070 A1 | 8/2011 | Makinwa et al. | |
| 2012/0049894 A1* | 3/2012 | Berchtold et al. | 327/94 |
| 2012/0062205 A1* | 3/2012 | Levesque et al. | 323/318 |
| 2014/0169982 A1* | 6/2014 | Li et al. | 417/14 |

OTHER PUBLICATIONS

Lakdawala, Hasnain et al., "A 1.05 V 1.6 mW, 0.45 C 3 Resolution Based Temperature Sensor with Parasitic Resistance Compensation in 32 nm Digital CMOS Process", IEEE Journal of Solid State Circuits, vol. 44, No. 12, Dec. 2009, pp. 3621-3630.

\* cited by examiner

THERMAL SENSOR WITH TEMPERATURE CONTROL

PRIORITY CLAIM

The present application claims the priority of U.S. Provisional Application No. 61/799,544, filed Mar. 15, 2013, the disclosure of which is incorporated herein by reference in its entirety.

BACKGROUND

Integrated circuits (ICs) typically generate heat when powered by an electric source such as a power supply. Overheating causes damage to the IC. Increases in clock speed, and device activity and the number of devices increases heating of the IC. A thermal management device employing a thermal sensor is typically used to prevent ICs from overheating. The thermal sensor detects a temperature of the IC. Analog circuitry is used to detect the temperature of the IC, and voltage and current characteristics are changed depending upon the temperature of the IC.

An output of the thermal sensor includes a temperature-independent (fixed reference) signal and a temperature-dependent signal and is input to an analog-to-digital converter (ADC) and transformed from voltage-to-frequency, voltage-to-voltage, current-to-voltage, and current-to-time based on a temperature detected by the thermal sensor. The transformed signals are compared with each other to determine a ratio of the temperature-dependent signal over the temperature-independent signal. A linear transfer of voltage-to-frequency, for example, is a challenge due to sensitivity to process variation. In some existing methods, sigma-delta ADC's are used and are based on sigma-delta modulation (SDM). The sigma-delta ADCs typically include a sigma-delta modulator (i.e., a first-order modulator) and a digital decimation filter. The sigma-delta modulator includes an integrator, a quantizer, a loop filter, and a feedback path including a digital-to-analog converter (DAC) which performs digital-to-analog conversion based on a reference signal $V_{ref}$. The output of the DAC is subtracted from the input signal at the adder and an output of the quantizer is processed in the digital decimation filter.

BRIEF DESCRIPTION OF THE DRAWINGS

Reference is now made to the following descriptions taken in conjunction with the accompanying drawings, in which.

DETAILED DESCRIPTION

The making and using of the embodiments of the disclosure are discussed in detail below. It should be appreciated; however, that the embodiments provide many applicable inventive concepts that can be embodied in a wide variety of specific contexts. The specific embodiments discussed are examples, and are not intended to limit the scope of the disclosure.

Some embodiments of the present disclosure provide a compact thermal sensor for multi-core processor applications in advanced processes such as 20 nanometer (nm) and 28 nanometer processes. The thermal sensor is not limited to being used with only advanced processes and is applicable to other processes, as suitable. The thermal sensor employs a current-to-voltage modulation method for translating a temperature-dependent current signal to a digitized output. The temperature-dependent current signal is suitable for multi-point detection application in which thermal sensors are arranged at various locations in an IC for monitoring a thermal distribution among different blocks in the IC.

Figure 1:
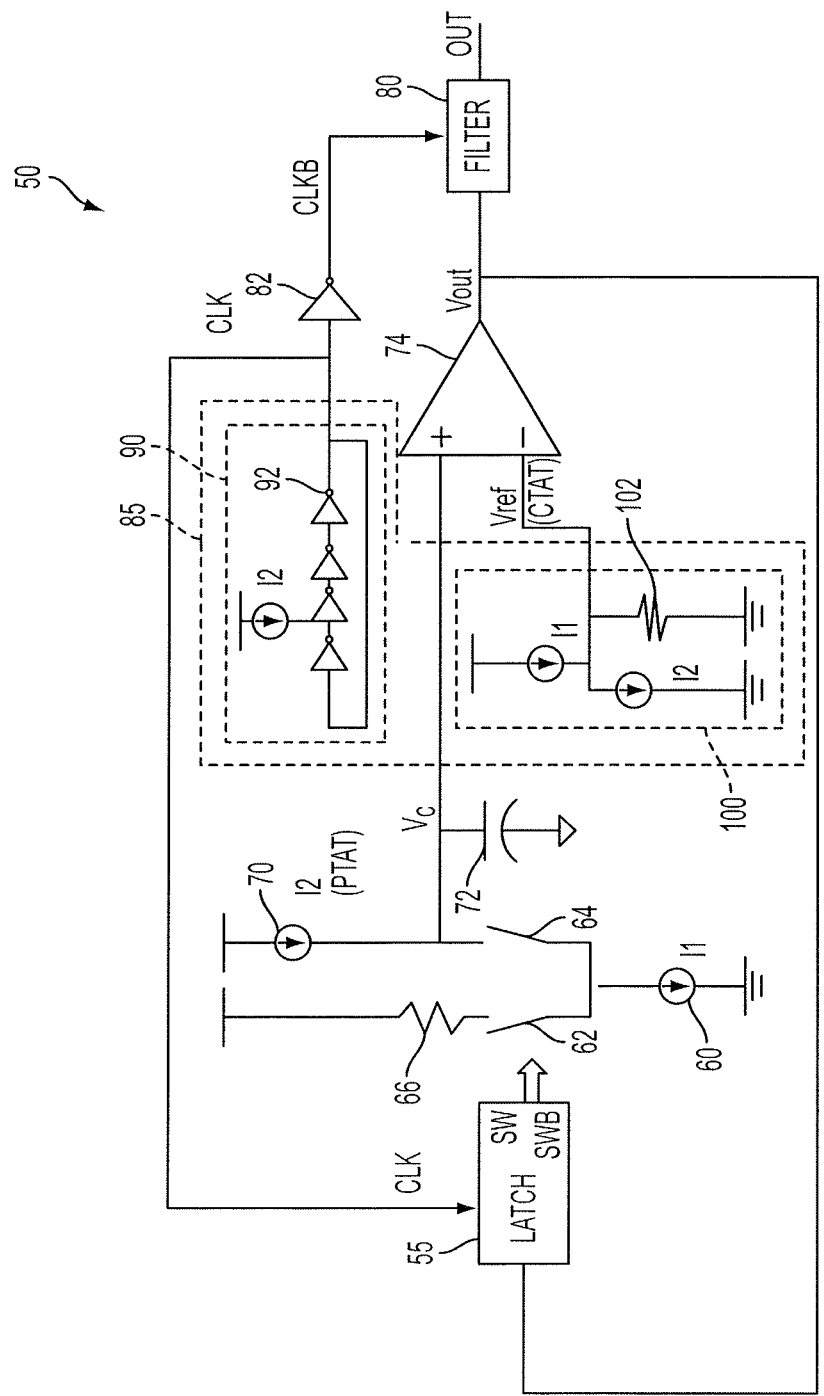
FIG. 1 is a block diagram of a thermal sensor in accordance with one or more embodiments.

FIG. 1 is a block diagram of a thermal sensor 50 in accordance with one or more embodiments. The thermal sensor 50 includes a latch 55, a first current source 60, a first switch device 62, a second switch device 64, a resistor 66, a second current source 70 and a capacitor 72. The thermal sensor 50 further includes a comparator 74, a digital filter 80 and an inverter 82. The thermal sensor 50 further includes a temperature control circuit 85 that includes an oscillator 90 and a reference voltage control circuit 100.

The latch 55 is in communication with a first switch path corresponding to the first switch device 62 and a second switch path corresponding to the second switch 64 and is configured to selectively connect or disconnect the first and second current sources 60 and 70 based on an input to the latch. Specifically, the latch 55 outputs a signal SWB to control the first switch device 62, and a signal SW to control the second switch device 64.

The first switch device 62 is coupled between the resistor 66 and the first current source 60 forming the first switch path, and the second switch device 64 is also coupled between the first current source 60, the second current source 70 and the capacitor 72 forming the second switch path. The first current source 60 is configured to supply a first current signal (I1) which is a temperature-independent signal (i.e., a reference signal). The first current signal I1 is used to discharge the capacitor 72 based on a difference between a second current signal I2 (discussed below) and the first current signal I1.

The second current source 70 is coupled to the capacitor 72 and is configured to supply the second current signal (I2). The second current signal I2 is a temperature-dependent signal (i.e., proportional to absolute temperature (PTAT)) and is indicative of the temperature detected by the thermal sensor 50. In one or more embodiments, the second current source 70 is a temperature sensor, or coupled to a temperature sensor, that detects a temperature and generates the second current signal I2 dependent on the detected temperature. An example of a temperature sensor used in at least one embodiment is a silicon-based temperature sensor. The second current signal (I2) is used to charge the capacitor 72. The capacitor 72 is also coupled with a first input of the comparator 74.

The temperature control circuit 85 includes an oscillator 90 comprising a delay cell 92 including a plurality of series-connected inverters coupled with the second current source 70. The oscillator 90 has an output that is coupled to an input of the inverter 82 and an output of the inverter 82 is coupled with the digital filter 80. The oscillator 90 is a current-driven oscillator that delays an output clock signal based on the received second current signal I2 of the second current source 70. Further, the oscillator 90 also sends a delayed clock signal CLK back to the latch 55 to control a timing of the latch 55 for opening and closing the first and second switch paths based on a clock rate of the clock signal CLK. The clock signal CLK is also supplied from the oscillator 90 to the inverter 82 that outputs an inverse of the clock signal CLK, i.e., a clock signal CLKB, to the digital filter 80 to control a timing of a counting operation in the digital filter 80.

Further, the reference voltage control circuit 100 includes a resistor 102 and the reference voltage control circuit 100 is coupled to a second input of the comparator 74. The reference voltage control circuit 100 determines and generates a reference voltage $V_{ref}$ to the second input of the comparator 74. According to one embodiment, the reference voltage is complementary to absolute temperature (CTAT), i.e., the reference voltage decreases substantially linearly as the temperature increases. The current signal through the resistor 102 is formed by subtracting the second current signal I2 from the first current signal I1, the resulting current is a CTAT current through the resistor 102 to generate voltage $V_{ref}$ (CTAT).

The comparator 74 is configured to compare the capacitor voltage $V_c$ with the reference voltage $V_{ref}$ to generate an output voltage ($V_{out}$).

In an initial state of the thermal sensor 50, the latch 55 closes the first switch path (i.e., closes the first switch device 62) and opens the second switch path (i.e., opens the second switch device 64) to disconnect the first current source 60 from the capacitor 72, and pulls the first current signal I1 through the resistor 66. The second current source 70 supplies the second current signal I2 to charge the capacitor 72 to a capacitor voltage $V_c$. The capacitor voltage $V_c$ is input into the comparator 74 and compared with the reference voltage $V_{ref}$ generated by the reference voltage control circuit 100. The comparator 74 then outputs the output voltage $V_{out}$ as a feedback signal transmitted to the latch 55 for determining whether to charge or discharge the capacitor 72.

If the capacitor voltage $V_c$ is higher than the reference voltage $V_{ref}$, then the output voltage $V_{out}$ of a logic high level "1" is sent to the latch 55 as the feedback signal, and the latch 55 selectively connects the first current source 60 (e.g., by opening the first switch device 62 and closing the second switch device 64) to discharge the capacitor 72 based on a difference between the second current signal I2 and the first current signal I1. According to one or more embodiments, charging and discharging of the capacitor 72 is a continuous current-to-voltage modulation process. The capacitor voltage $V_c$ is increased or decreased based on the respective charge current (I2) and discharge current (I1 minus I2).

Further, according to one or more embodiments, pulse density u of the output voltage $V_{out}$ is determined based on the following equation:

$$\underbrace{\frac{-(I1-I2)*t_1}{T}}_{\text{(Discharging with time } t_1\text{)}} + \underbrace{\frac{(I2)*(T-t_1)}{T}}_{\text{(Charging with time }(T-t_1))} = 0$$

where T corresponds to a repeat cycle time; $t_1$ corresponds to the ON time of the output voltage $V_{out}$ when the comparator 74 outputs a high logic level "1", and (T-$t_1$) corresponds to the OFF time of the output voltage $V_{out}$ when the comparator 74 outputs a low logic level "0". The pulse density u is a ratio of the ON time $t_1$ to the cycle time T. By replacing $t_1/T$ with u in the above equation, the following relationship is obtained:

(I1-I2)*u=I2*(1-u), or u=I2/I1.

In a specific example, T corresponds to 1024 clock pulses in a 10-bit system, u is a ratio of a total number of clock pulses corresponding to $V_{out}$ at the high logic level "1" counted over the cycle time T divided by 1024. The pulse density u is the current ratio I2/I1.

Because the first current signal I1 is a temperature-independent signal and the second current signal I2 is a temperature-dependent signal that is indicative of the temperature detected by the thermal sensor 50, the pulse density u or ratio I2/I1 is also indicative of the detected temperature.

Further, the digital filter 80 counts a number of clock pulses corresponding to the ON time ($t_1$) of the output voltage $V_{out}$ during a counting window of a predetermined number of clock pulses, for example, 1024 clock pulses. The clock pulses have a clock rate determined by the clock signal CLKB supplied from the oscillator 90 and the inverter 82. In at least one embodiment, the digital filter 80 is a down-counter that decrements a least significant bit (LSB) of the count and reads out the result. The readout OUT is the digitized pulse density representing the ratio (I2/I1) which indicates the temperature detected by the thermal sensor 50.

According to other embodiments, the second current signal I2 is complementary to the absolute temperature (CTAT) and the reference voltage $V_{ref}$ is proportional to the absolute temperature (PTAT). In these embodiments, the digital filter 80 is an up-counter that increments the LSB of the count.

After 1024 clock cycles, the total number of clock pulses corresponding to the ON time ($t_1$) of the output voltage $V_{out}$ is outputted as the readout OUT that indicates the ratio of I2/I1 (i.e., the temperature detected by the thermal sensor 50), and the digital filter 80 is reset to repeat the counting operation. In a particular example, if the temperature detected by the thermal sensor 50 is 75° C., then the second (CTAT) current signal I2 is ⅓ of the first current signal I1, the digital filter 80 counts ⅓ of the 1024 counts (i.e., about −341 counts) as corresponding to the ON time of the output voltage $V_{out}$ and outputs an appropriate readout OUT representing the counted number and also representing the temperature detected by the thermal sensor 50.

The temperature control circuit 85 according to some embodiments of the present disclosure, provides ways to eliminate, or at least reduce, excessive voltage swing of the capacitor voltage $V_c$ and/or voltage deviation of the reference voltage $V_{ref}$ by adjusting the capacitor voltage $V_c$ and/or the reference voltage $V_{ref}$ according to temperature variations. The clock rate of the clock signal CLK provided by the oscillator 90 and the level of the reference voltage $V_{ref}$ are adjusted according to the detected temperature to provide control of analog performance and/or response time of the thermal sensor 50.

When charging or discharging of the capacitor 72, a deviation of the capacitor voltage $V_c$ potentially causes current inaccuracy. The temperature control circuit 85 in accordance with some embodiments eliminates, or at least reduces, variations of the capacitor voltage $V_c$ to control the current accuracy.

Figure 2:
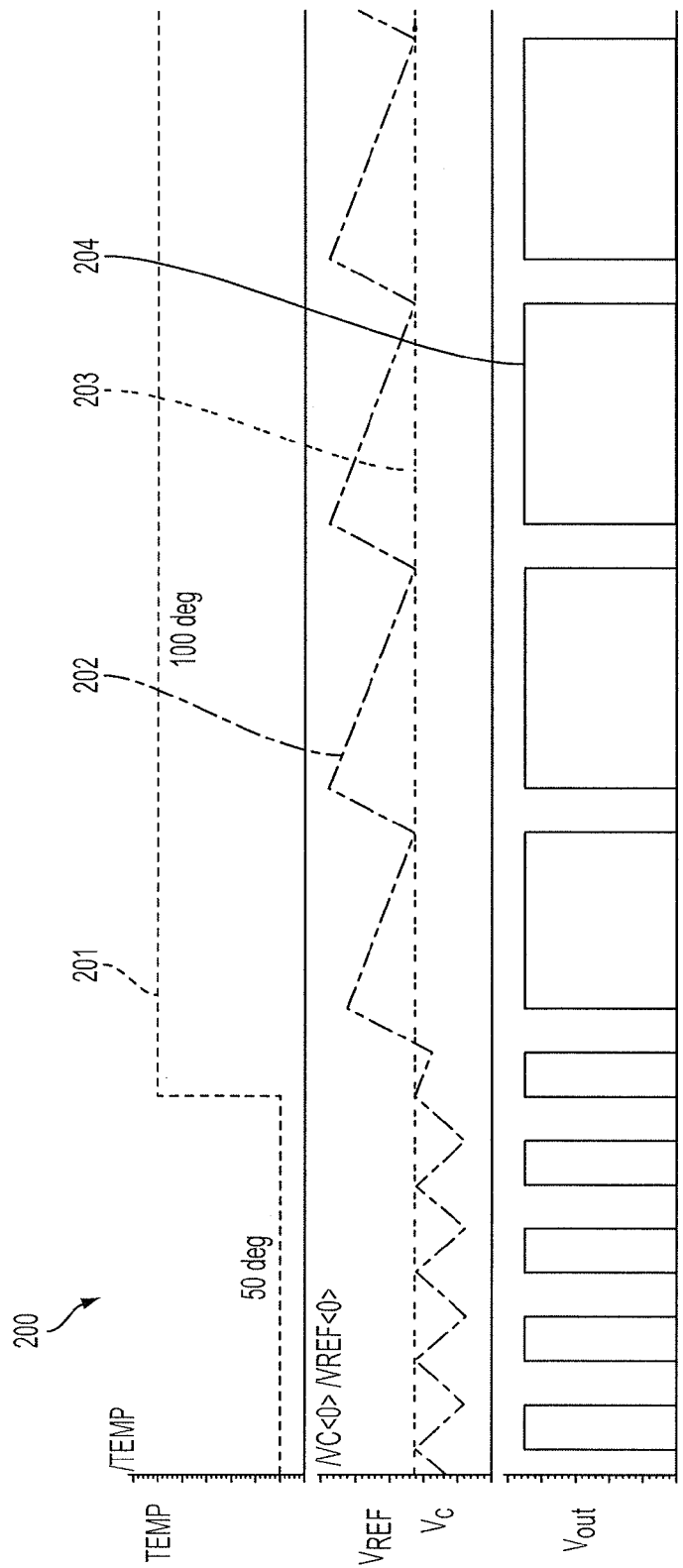
FIG. 2 is a timing diagram of operation of a thermal sensor without temperature adapted control.

FIG. 2 is a timing diagram 200 of operation of a thermal sensor without temperature adapted control. An example of a thermal sensor without temperature adapted control is the thermal sensor 50 without the temperature control circuit 85, and the reference voltage $V_{ref}$ has a fixed voltage level. In a waveform 201, the temperature (Temp) detected by the thermal sensor is shown at 50° C. and 100° C.

At 50° C., the capacitor voltage $V_c$ shown as waveform 202 in comparison to the reference voltage $V_{ref}$ shown as waveform 203, and the output voltage $V_{out}$ shown as waveform 204 includes pulses having a pulse density proportional to the ratio (I2/I1).

At 100° C., the capacitor voltage $V_c$ has a different relationship with the reference voltage $V_{ref}$; therefore, the output voltage $V_{out}$ has a greater pulse density than that at 50° C., and the pulse density is proportional to the temperature variation.

The capacitor voltage $V_c$ is different at the different temperatures. For example, at 100° C., the capacitor voltage $V_c$ has a peak to peak voltage swing and an average voltage level which are higher than those at 50° C.

The following equation is implemented by the oscillator 90 in accordance with some embodiments to eliminate, or at least reduce, potential voltage swing issues of the capacitor voltage $V_c$ of the capacitor 72:

$$V_c = I*(1/sC),$$

where I is the discharge/charge current of the capacitor 72 (e.g., the second current signal I2); s corresponds to the frequency of the current I; and C corresponds to the capacitance of the capacitor 72. In some embodiments, the discharge/charge current I of the capacitor 72 is a temperature-dependent current. According to one or more embodiments, the current I increases with the detected temperature (i.e., the current I is proportional to absolute temperature (PTAT)). Further, the capacitance C possibly varies with process, voltage, and/or temperature (PVT) variations.

Therefore, the capacitor voltage $V_c$ is proportional to I/C. The capacitor voltage $V_c$ is also proportional to 1/Fclk, where Fclk corresponds to a clock frequency (i.e., the clock rate) of the clock signal CLK generated by the oscillator 90 and supplied to the latch 55 which, in turn, controls discharging and charging of the capacitor 72. The oscillator 90 varies the clock rate Fclk according to the discharge/charge current I, i.e., according to the detected temperature. For example, in one or more embodiments, the oscillator 90 varies the clock rate Fclk such that $$Fclk = k*(I''/C''),$$

where k corresponds to a constant value; I'' corresponds to the current I (e.g., the second current signal I2 in the oscillator 90; and C'' corresponds to the capacitance in the delay cell 92 of the oscillator 90 and has the same PVT variation effects as the capacitance C of the capacitor 72. The resultant equation for $V_c$ is as follows:

$$V_c = I/(Fclk)*C = I/(k*I''/C'')*C = k''$$

Thus, by using the oscillator 90 to vary the clock rate in accordance with the discharge/charge current I (i.e., in accordance with the detected temperature) according to one or more embodiments, the peak to peak voltage swing of the capacitor voltage $V_c$ is kept constant (because k'' is a constant) regardless of PVT variations.

In the specific embodiment in FIG. 1, in the oscillator 90 of the temperature control circuit 85, the second current signal I2 of the second current source 70 is proportional to absolute temperature (PTAT) and is input into the delay cell 92 to adjust the clock rate of the clock signal CLK supplied to the latch 55. For example, when the detected temperature increases, the second current signal I2 also increases, and the oscillator 90 increases the clock rate Fclk of the clock signal CLK supplied to the latch 55. As a result, the latch 55 outputs the signals SWB and/or SW at the increased clock rate, causing the capacitor 72 to charge and discharge more frequently, which, in turn, keeps the peak to peak voltage swing of the capacitor voltage V, constant despite the increased charging current, i.e., the increased second current signal I2. When the detected temperature decreases, the second current signal I2 decreases, the oscillator 90 decreases the clock rate Fclk, the latch 55 causes charging and discharging of the capacitor 72 less frequently and keeps the peak to peak voltage swing of the capacitor voltage $V_c$ constant despite the decreased charging current, i.e., the decreased second current signal I2. Therefore, the peak to peak voltage swing of the capacitor voltage $V_c$ of the capacitor 72 is maintained at a constant rate regardless of temperature variations, as described in more detail with respect to FIG. 3.

Figure 3:
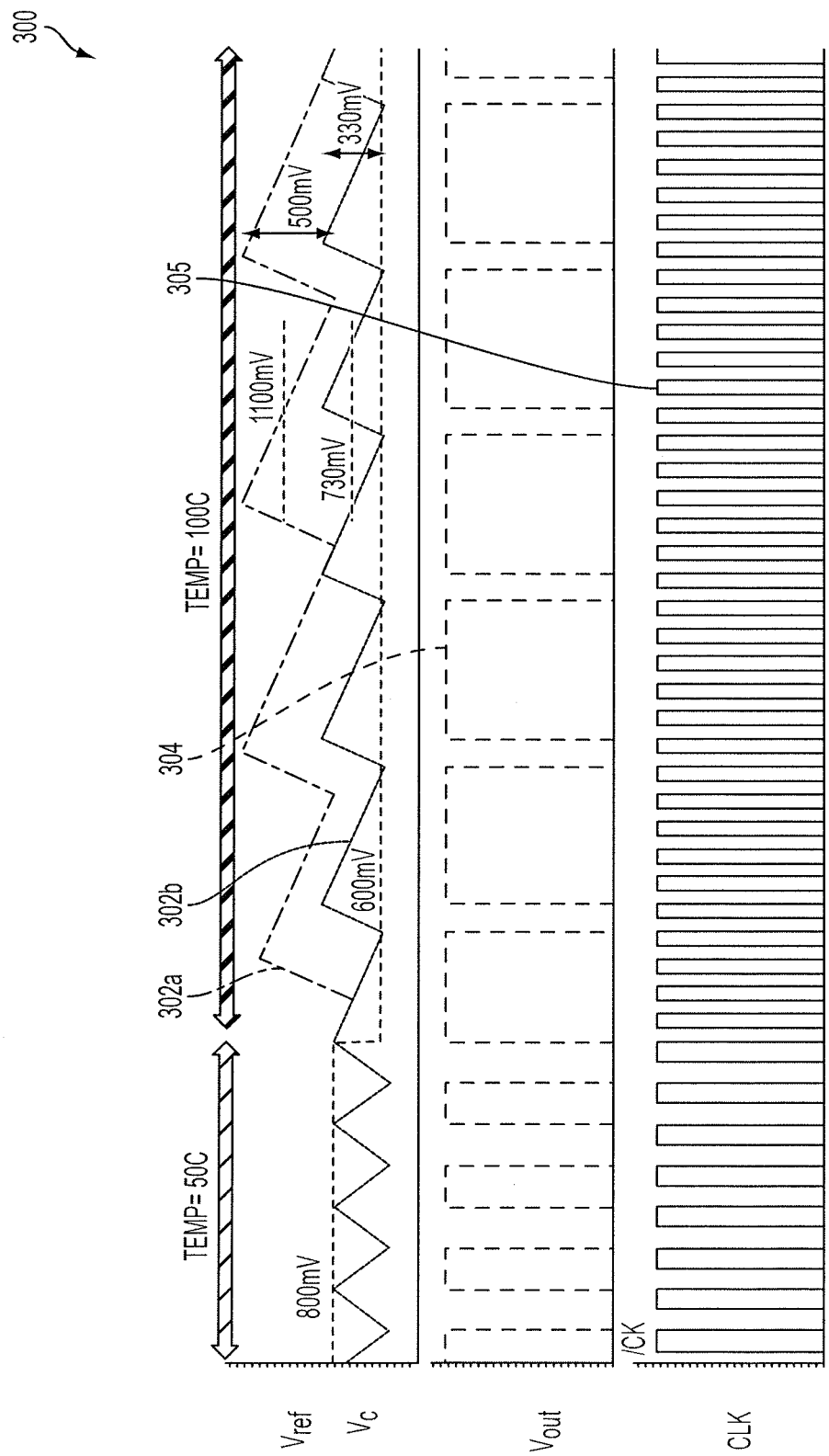
FIG. 3 is a timing diagram of operation of a thermal sensor with temperature adjusted control in accordance with one or more embodiments.

FIG. 3 is a timing diagram 300 of operation of the thermal sensor 50 with temperature adjusted control in accordance with one or more embodiments. By use of the oscillator 90, the peak to peak voltage swing of the capacitor voltage $V_c$ is reduced at the input of the comparator 74, from 500 millivolts (mV) without compensation of the capacitor voltage $V_c$ (as shown in waveform 302a when the oscillator 90 is not used) to about 330 mV (or better with further optimization) with compensation of the capacitor voltage $V_c$ (as shown in waveform 302b when the oscillator 90 is used) at the detected temperature of 100° C.

Further, regarding the average voltage of the capacitor voltage $V_c$, by use of the reference voltage control circuit 100, the reference voltage $V_{ref}$ is proportional to m/temp, where m is a constant value. Therefore, the reference voltage $V_{ref}$ is lowered at higher detected temperatures. In the example in FIG. 3, the reference voltage $V_{ref}$ (shown in waveform 303) decreases from about 800 mV at 50° C. to about 600 mV at 100° C. The average level of the capacitor voltage $V_c$ is decreased from about 1100 mV without compensation (i.e., when the reference voltage $V_{ref}$ is fixed) to about 730 mV with $V_{ref}$ control (i.e., when the reference voltage $V_{ref}$ is varied in accordance with the detected temperature). With the combined temperature adapted control provided by the oscillator 90 and the reference voltage control circuit 100, it is possible to keep the peak to peak voltage swing and average level of the capacitor voltage $V_c$ constant, or with tolerable variations, across PVT variations to have good current accuracy and temperature detection performance.

The pulse density u of the output voltage $V_{out}$ (shown in waveform 304) at the detected temperature of 50° C. is about 50%, i.e., for every two clock pulses, there is one clock pulse corresponding to $V_{out}$ at the high logic level "1." The pulse density u of the output voltage $V_{out}$ at the detected temperature of 100° C. is about 83%, i.e., for every six clock pulses, there are five clock pulses corresponding to $V_{out}$ at the high logic level "1." The pulse density u of the output voltage $V_{out}$ is increased from about 50% at the detected temperature of 50° C. to about 83% at the detected temperature of 100° C.

Further, in at least one embodiment, the clock rate Fclk determined at the oscillator 90 increases at higher temperatures (shown in waveform 305), for example, from 20 megahertz (MHz) at the detected temperature of 50° C. to 30 megahertz (MHz) at the detected temperature of 100° C.; therefore, the response time at the latch 55 is also faster at higher temperatures, for example, the response time increases from 205 microseconds (µs) at the detected temperature of 50° C. to about 135 µs at the detected temperature of 100° C. The property that a thermal sensor responds faster at higher temperatures is an advantage in some embodiments.

Figure 4:
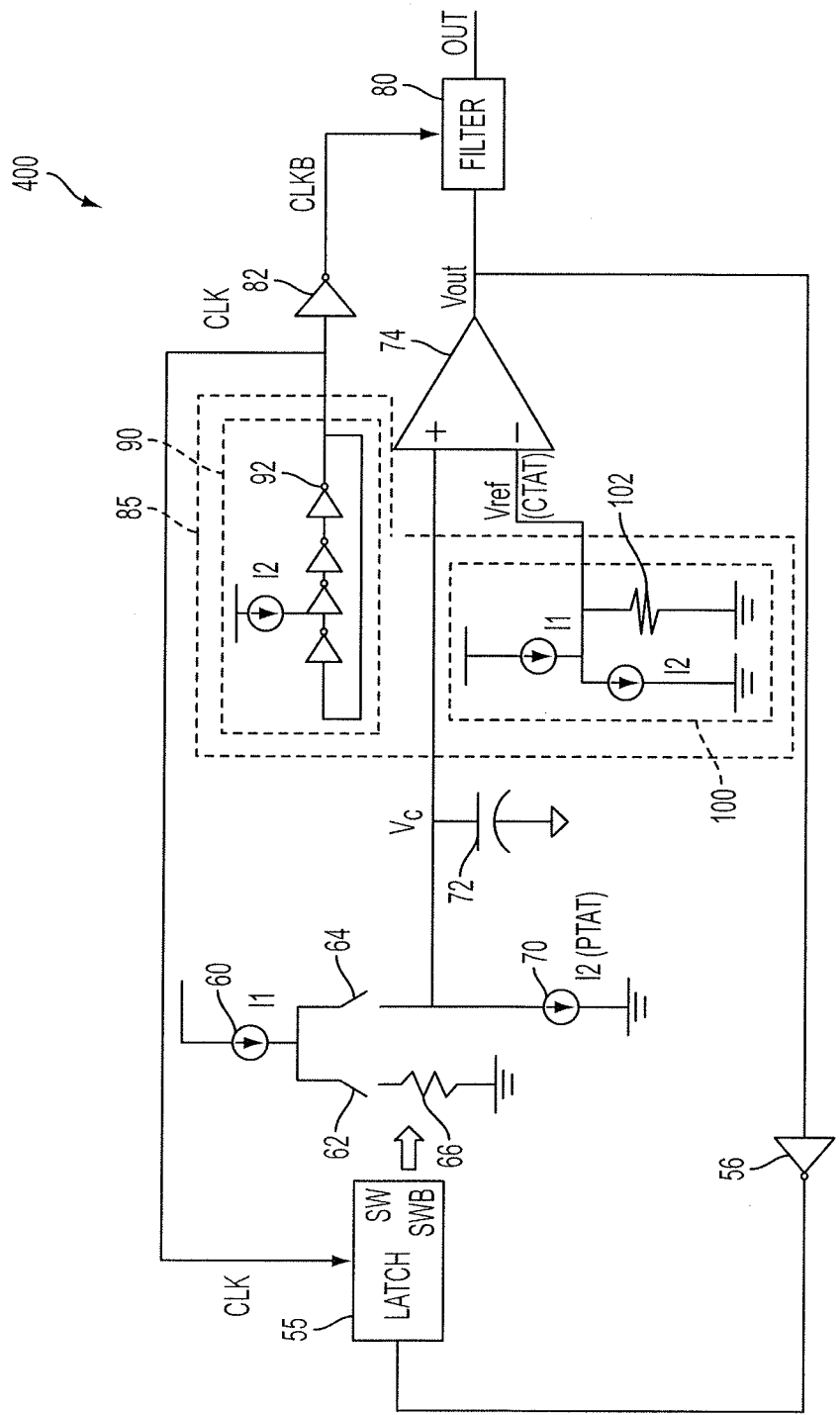
FIG. 4 is a block diagram of a thermal sensor in accordance with one or more embodiments.

FIG. 4 is a block diagram of a thermal sensor 400 in accordance with one or more alternative embodiments. The thermal sensor 400 includes the same elements as those of the thermal sensor 50 shown in FIG. 1; therefore a detailed description of these same elements is omitted. The configuration of the thermal sensor 400 is also similar to the thermal sensor 50 shown in FIG. 1, except the current (I1−I2) is used to charge the capacitor 72 and the second current signal I2 is used to discharge the capacitor 72.

In FIG. 4, if the output voltage $V_{out}$ is a high logic level "1," a feedback signal is sent to the latch 55 via an inverter 56 and the second switch device 64 is opened and the capacitor 72 is discharged by the second current signal I2. If the logic level of the output voltage $V_{out}$ is "0" then the feedback signal to the latch 55 via the inverter 56 is used to turn on (i.e., close) the second switch device 64 to connect the first current source 60 to the capacitor 72, and the capacitor 72 is charged by the current (I1–I2) which is the difference between the first current signal I1 of first current source 60 and the second current signal I2 of the second current source 70.

According to one or more embodiments, the second current signal I2 is proportional to the absolute temperature (PTAT) and the reference voltage $V_{ref}$ is complementary to the absolute temperature (CTAT) and the digital filter 80 decrements a count of the received clock pulses in accordance with the pulse density u of the output voltage $V_{out}$. According to other embodiments, the second current signal I2 is CTAT and the reference voltage is PTAT and the digital filter 80 increments the count of the received clock pulses accordance with the pulse density u of the output voltage $V_{out}$.

Figure 5:
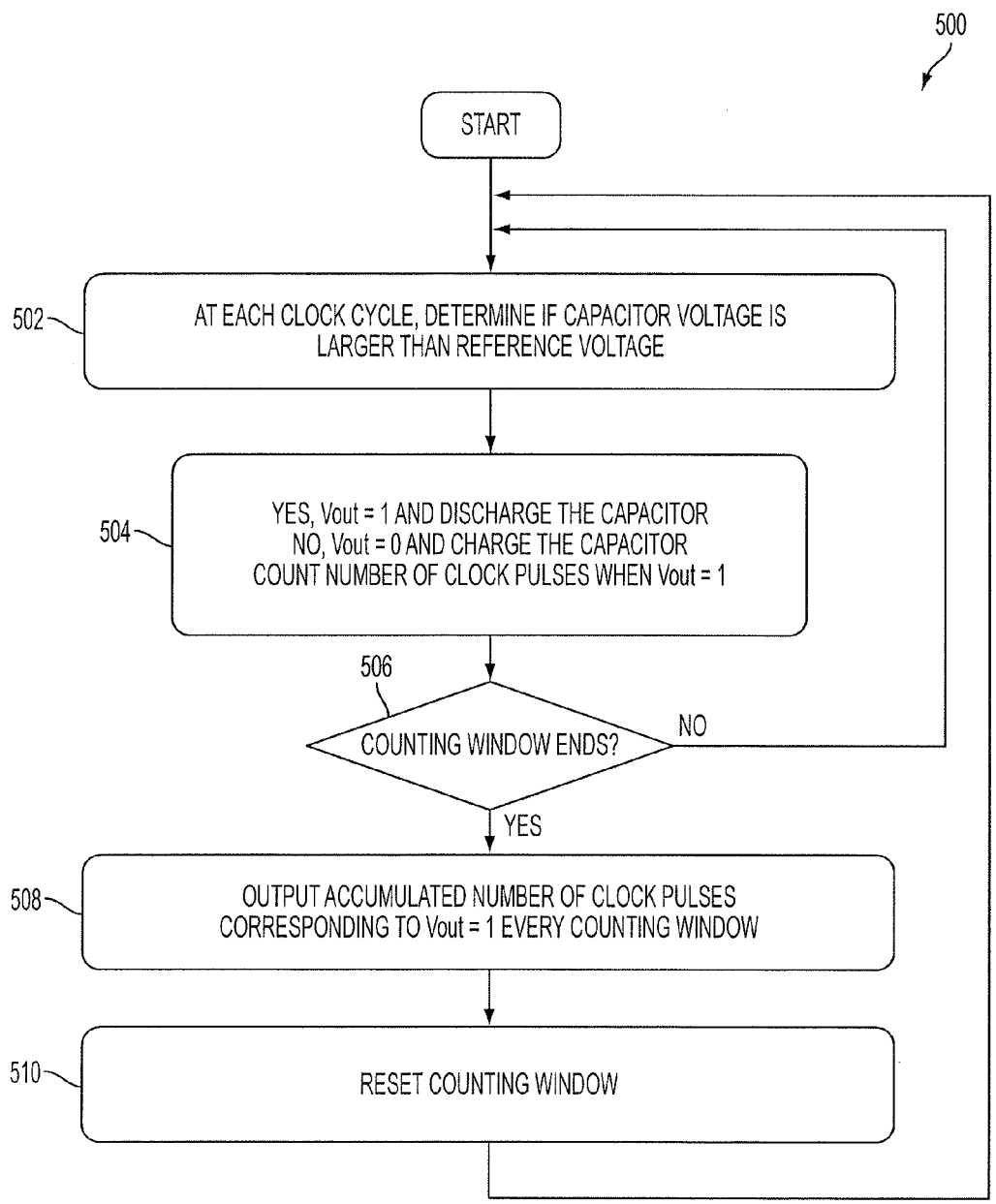
FIG. 5 is a process flow diagram of a method of operating a thermal sensor in accordance with one or more embodiments.

FIG. 5 is a process flow diagram of a method 500 of operating a thermal sensor (for example, thermal sensor 50 (FIG. 1) or the thermal sensor 400 (FIG. 4)) in accordance with one or more embodiments. In operation 502, the method begins by comparing the capacitor voltage V, of the capacitor 72 to the reference voltage $V_{ref}$ and determining, at each clock cycle, whether the capacitor voltage $V_c$ is larger than the reference voltage $V_{ref}$. From operation 502, the process continues to operation 504, where if the capacitor voltage $V_c$ is larger than the reference voltage $V_{ref}$, the output voltage $V_{out}$ is set to a logic high level "1" and the capacitor 72 is discharged. The discharging of the capacitor 72 includes connecting (FIG. 1)/disconnecting (FIG. 4) the first current source 60 to/from the capacitor 72 by closing (FIG. 1)/opening (FIG. 4) the second switch device 64. If the capacitor voltage $V_c$ of the capacitor 72 is less than the reference voltage $V_{ref}$, the output voltage $V_{out}$ is set to a logic low level "0" and the capacitor 72 is charged. The charging of the capacitor 72 includes disconnecting (FIG. 1)/connecting (FIG. 4) the first current source 60 from/to the capacitor 72 by opening (FIG. 1)/closing (FIG. 4) the second switch device 64. The charge/discharge current (I) to increase/decrease the capacitor voltage $V_c$ on the capacitor 72 is represented by the following equation:

$$I=-/+u*[I1-I2]+/-(1-u)*I2,$$

wherein u corresponds to the pulse density u of the output voltage $V_{out}$ of the comparator 74, I1 corresponds to the first current signal of the first current source 60, and I2 corresponds to the second current signal of the second current source 70. In the thermal sensor 50 of FIG. 1, I=−u*[I1−I1]+(1−u)*I2, where −u*[I1−I2] is the discharging current while +(1−u)*I2 is the charging current. In the thermal sensor 400 of FIG. 4, I=+u*[I1−I2]−(1−u)*I2, where +u*[I1−I2] is the charging current while −(1−u)*I2 is the discharging current.

Figure 6:
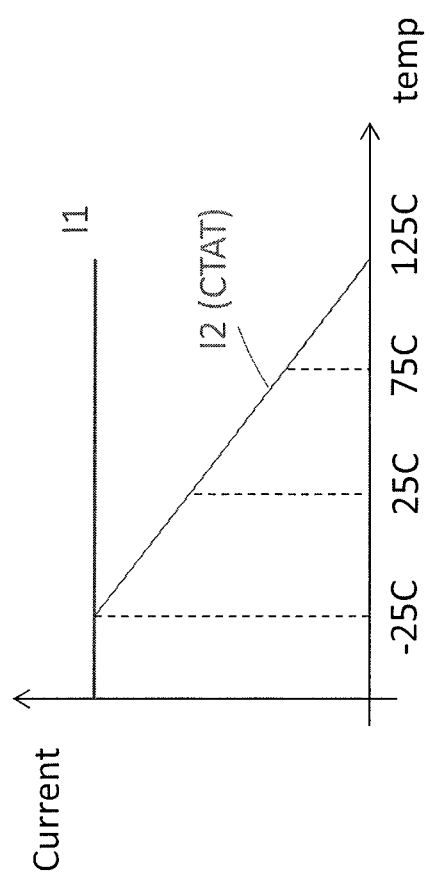
FIG. 6 is a graph showing a specific example of determining an output of a thermal sensor in accordance with one or more embodiments.

The number of clock pulses when the output voltage $V_{out}$ has a logic high level "1" is counted, either by a down-counter (when I2 is PTAT and $V_{ref}$ is CTAT) or a up-counter (when I2 is CTAT and $V_{ref}$ is PTAT). A specific example is given in FIG. 6 when I2 is CTAT, $V_{ref}$ is PTAT, and the digital filter 80 is a up-counter. Assuming that the temperature detected by the thermal sensor is 75° C., then the second (CTAT) current signal I2 is ⅓ of the first current signal I1. Because I2/I1 is ⅓, ⅓ of the 1024 clock pulses (i.e., about 341 pulses) correspond to the ON time of the output voltage $V_{out}$. The digital filter 80 counts up 341 counts from zero and outputs a readout OUT of 341 counts representing the detected temperature of 75° C. In another example (not shown), I2 is PTAT, $V_{ref}$ is CTAT, and the digital filter 80 is a down-counter. Assuming that the temperature detected by the thermal sensor is 75° C., then the second (PTAT) current signal I2 is ⅔ of the first current signal I1. Because I2/I1 is ⅔, ⅔ of the 1024 clock pulses (i.e., about 683 pulses) correspond to the ON time of the output voltage $V_{out}$. The digital filter 80 counts down 683 counts from 1024 and outputs the same readout OUT of 341 counts representing the detected temperature of 75° C. In both examples, the readout OUT is inverse proportional to the detected temperature.

The process proceeds to operation 506 to determine whether the counting window has ended. In some embodiments, the counting window includes 1024 clock pulses. Other sizes (i.e., numbers of clock pulses) of the counting window are within the scope of various embodiments. If the counting window has not ended (No at operation 506), the process returns to operation 502 where the capacitor voltage $V_c$ is compared with the reference voltage $V_{ref}$ by the comparator to determine whether the capacitor voltage $V_c$ is larger than the reference voltage $V_{ref}$, and repeats operations 504 and 506.

If the counting window has ended (Yes at operation 506), the accumulated number of clock pulses corresponding to the logic high level "1" of the output voltage $V_{out}$ is outputted at operation 508 as the readout OUT that indicates the detected temperature. The processes then resets the counting window at operation 510 and returns to operation 502.

The above method embodiment shows example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

One or more embodiments include a thermal sensor comprising a latch, a capacitor and a comparator. The latch is configured to selectively connect or disconnect a first current signal and the capacitor in response to a feedback signal. The capacitor is configured to be charged or discharged by at least one of the first current signal or a second current signal. The comparator is coupled with the capacitor and configured to output an output voltage based on a comparison of a capacitor voltage of the capacitor to a reference voltage. The first current signal is a temperature-independent signal, and the second current signal is a temperature-dependent signal dependent on a temperature detected by the thermal sensor. The output voltage defines the feedback signal and has a pulse density indicative of the temperature detected by the thermal sensor.

One or more embodiments include a thermal sensor comprising a capacitor, a comparator and a temperature control circuit. The capacitor is configured to be charged or discharged by at least one of a first current signal or a second current signal. The comparator is coupled with the capacitor and configured to output an output voltage based on a comparison of a capacitor voltage of the capacitor to a reference voltage. The output voltage has a pulse density indicative of the temperature detected by the thermal sensor. The temperature control circuit is configured to vary the reference voltage in accordance with the detected temperature.

One or more embodiments include a method of operating a thermal sensor, the method comprises comparing a capacitor voltage of a capacitor with a reference voltage, generating an output voltage based on the comparison, and charging or discharging the capacitor using at least one of a first current signal or a second current signal based on a logic level of the output voltage. The output voltage has a pulse density indicative of a temperature detected by the thermal sensor. The first current signal is a temperature-independent signal, and the second current signal is a temperature-dependent signal dependent on the temperature detected by the thermal sensor.

Although the embodiments and their advantages have been described in detail, it should be understood that various changes, substitutions and alterations could be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A thermal sensor, comprising:
   a capacitor configured to be charged or discharged by at least one of a first current signal or a second current signal;
   a latch configured to selectively connect or disconnect the first current signal and the capacitor in response to a feedback signal; and
   a comparator coupled with the capacitor and configured to output an output voltage based on a comparison of a capacitor voltage of the capacitor to a reference voltage;
   wherein
   the first current signal is a temperature-independent signal, and the second current signal is a temperature-dependent signal dependent on a temperature detected by the thermal sensor, and
   the output voltage defines the feedback signal and has a pulse density indicative of the temperature detected by the thermal sensor.

2. The thermal sensor of claim 1, further comprising:
   a digital filter coupled to the comparator to receive and digitize the output voltage.

3. The thermal sensor of claim 1, wherein the second current signal is proportional to the detected temperature.

4. The thermal sensor of claim 1, wherein
   the capacitor is configured to be discharged in response to the feedback signal indicating that the capacitor voltage is greater than the reference voltage, and
   the capacitor is configured to be charged in response to the feedback signal indicating that the capacitor voltage is less than the reference voltage.

5. The thermal sensor of claim 4, wherein
   in response to the feedback signal indicating that the capacitor voltage is greater than the reference voltage, the latch is configured to connect the first current signal and the capacitor to discharge the capacitor with a signal being a difference between the first and second current signals, and
   in response to the feedback signal indicating that the capacitor voltage is less than the reference voltage, the latch is configured to disconnect the first current signal from the capacitor to charge the capacitor with the second current signal.

6. The thermal sensor of claim 5, wherein the second current signal is a proportional to absolute temperature (PTAT) signal.

7. The thermal sensor of claim 4, wherein
   in response to the feedback signal indicating that the capacitor voltage is greater than the reference voltage, the latch is configured to disconnect the first current signal from the capacitor to discharge the capacitor with the second current signal, and
   in response to the feedback signal indicating that the capacitor voltage is less than the reference voltage, the latch is configured to connect the first current signal to the capacitor to charge the capacitor with a signal being a difference between the first and second current signals.

8. The thermal sensor of claim 7, wherein the second current signal is a complementary to absolute temperature (CTAT) signal.

9. The thermal sensor of claim 1, further comprising:
   a temperature control circuit configured to output a clock signal to the latch, and to vary a clock rate of the clock signal in accordance with the detected temperature to control a timing operation of the latch for supplying the first current signal to the capacitor.

10. The thermal sensor of claim 9, wherein the temperature control circuit is configured to increase the clock rate of the clock signal as the detected temperature increases.

11. The thermal sensor of claim 9, wherein the temperature control circuit is further configured to vary the reference voltage in accordance with the detected temperature.

12. The thermal sensor of claim 11, wherein the reference voltage is a proportional to absolute temperature signal, and the second current signal is a complementary to absolute temperature signal.

13. The thermal sensor of claim 11, wherein the reference voltage is a complementary to absolute temperature signal, and the second current signal is a proportional to absolute temperature signal.

14. A thermal sensor, comprising:
   a capacitor configured to be charged or discharged by at least one of a first current signal or a second current signal, wherein the first current signal is a temperature-independent signal, and the second current signal is a temperature-dependent signal dependent on a temperature detected by the thermal sensor;
   a comparator coupled with the capacitor and configured to output an output voltage based on a comparison of a capacitor voltage of the capacitor to a reference voltage, wherein the output voltage has a pulse density indicative of the temperature detected by the thermal sensor; and
   a temperature control circuit configured to vary the reference voltage in accordance with the detected temperature.

15. The thermal sensor of claim 14, wherein the temperature control circuit is further configured to vary a clock rate of a clock signal in accordance with the detected temperature to control a timing operation of supplying the first current signal to the capacitor.

16. The thermal sensor of claim 15, wherein the temperature control circuit comprises:
an oscillator comprising a delay cell,
wherein the oscillator is configured to delay the clock signal based on the second current signal, and to supply the delayed clock signal to control the timing operation for supplying the first current signal to the capacitor.

17. The thermal sensor of claim 14, wherein the temperature control circuit comprises a reference voltage control circuit comprising a resistor,
wherein the reference voltage control circuit is configured to generate the reference voltage based on a current flowing through the resistor, the current based on a difference between the second current signal and the first current signal.

18. A method of operating a thermal sensor, said method comprising:
comparing a capacitor voltage of a capacitor with a reference voltage;
generating an output voltage based on the comparison, the output voltage having a pulse density indicative of a temperature detected by the thermal sensor; and
charging or discharging the capacitor using at least one of a first current signal or a second current signal based on a logic level of the output voltage,
wherein the first current signal is a temperature-independent signal, and the second current signal is a temperature-dependent signal dependent on the temperature detected by the thermal sensor.

19. The method of claim 18, wherein said charging or discharging comprises:
discharging the capacitor when the capacitor voltage exceeds the reference voltage; and
charging the capacitor when the capacitor voltage is less than the reference voltage.

20. The method of claim 18, further comprising at least one of
varying a clock rate of a clock signal in accordance with the detected temperature to control a timing operation for supplying the first current signal to the capacitor, or
varying the reference voltage in accordance with the detected temperature.

* * * * *